(12) United States Patent
Masuyama et al.

(10) Patent No.: US 7,441,916 B2
(45) Date of Patent: Oct. 28, 2008

(54) SURFACE LIGHT SOURCE DEVICE WITH HALF-ELLIPSE REFLECTING PLATE

(75) Inventors: Koichi Masuyama, Tokyo (JP); Naoya Sone, Yokohama (JP); Yuichiro Yamada, Nagoya (JP); Makoto Tsumura, Hitachi (JP)

(73) Assignee: Future Vision Inc., Tokyo (JP)

( * ) Notice: Subject to any disclaimer, the term of this patent is extended or adjusted under 35 U.S.C. 154(b) by 102 days.

(21) Appl. No.: 11/353,171

(22) Filed: Feb. 14, 2006

(65) Prior Publication Data

US 2007/0103935 A1    May 10, 2007

(30) Foreign Application Priority Data

Nov. 7, 2005   (JP) ............................. 2005-322165
Nov. 11, 2005  (JP) ............................. 2005-326970

(51) Int. Cl.
*G09F 13/04* (2006.01)
(52) U.S. Cl. .................. 362/97; 362/241; 362/245; 362/623
(58) Field of Classification Search .............. 362/97, 362/241, 245, 623
See application file for complete search history.

(56) References Cited

U.S. PATENT DOCUMENTS 5,479,328 A * 12/1995 Lee et al. ................. 362/216

6,793,361 B2 * 9/2004 Matsui ........................ 362/97
7,163,315 B2 * 1/2007 Chang et al. ............... 362/245

FOREIGN PATENT DOCUMENTS

JP    2005-024746    1/2005

\* cited by examiner

*Primary Examiner*—Sandra O'Shea
*Assistant Examiner*—James W Cranson
(74) *Attorney, Agent, or Firm*—Antonelli, Terry, Stout & Kraus, LLP.

(57) ABSTRACT

A reflecting plate in form of dual half-ellipses comprises a first ellipse having a first focal point and a second focal point, and a second ellipse having a first focal point and a second focal point. The first ellipse and the second ellipse commonly share the first focal point. A cross-section of the reflecting plate is designed in such a form that the dual half-ellipses are aligned with each other, and that contours of the first ellipse and the second ellipse are divided by a straight line, which includes the commonly shared first focal point and the other focal points. The reflecting plate encloses the line light source by the dual half-ellipses and reflects a light from the line light source toward the diffusion plate arranged above by specular reflection and by diffused reflection. As a result, uneven brightness is eliminated at the boundary of the reflecting plate designed in form of dual half-ellipses.

15 Claims, 6 Drawing Sheets

SURFACE LIGHT SOURCE DEVICE WITH HALF-ELLIPSE REFLECTING PLATE

BACKGROUND OF THE INVENTION

The present invention relates to a lighting device (also called a backlight) to be installed on back surface of a liquid crystal display for illuminating said liquid crystal display from backside. In particular, the invention relates to a surface light source device, which does not cause uneven brightness.

In a transmission type liquid crystal display, a backlight for projecting an illuminating light of planar shape is installed on back surface of a liquid crystal panel for forming an electronic latent image. Here, the backlight of this type is called "a surface light source device". In this surface light source device, a plurality of line light sources are arranged in parallel to the back surface of the liquid crystal panel on a reflecting plate for effectively utilizing exit lights from the line light sources. It is generally practiced to have smooth and even in-plane distribution of the illuminating light by providing a light diffusion plate positioned between the liquid crystal panel and light source device. A polarizing plate is laminated on upper surface and lower surface of the liquid crystal panel, and the surface light source device is installed on back surface of the polarizing plate on lower side.

As a reflecting plate to be used in the surface light source device as described above, the Patented Reference 1 as given below describes a reflecting mirror for backlight, which comprises two half-ellipses aligned with each other and commonly sharing a first focal point, and second focal points are arranged one on each side of a straight line including the first focal point. By placing a light source at the first focal point, an image of the light source is formed at the second focal point so that it is seen as if there are three light sources.

[Patented Reference 1] JP-A-2005-24746

The Patented Reference 1 describes a reflecting mirror, which comprises two half-ellipses aligned with each other and reflects a light from a light source by specular reflection (or mirror reflection). However, this reference gives no description on a problem of uneven brightness at the boundary of the two half-ellipses.

It is an object of the present invention to provide a surface light source device in a lighting system, which comprises two half-ellipses aligned with each other and has a reflecting mirror for reflecting a light from the light source by specular reflection (or mirror reflection), and by which uneven brightness at a boundary of the two ellipses is eliminated.

To attain the above object, according to the present invention, it is provided a reflecting plate designed in concave form by aligning two half-ellipses to enclose the light source, and the reflecting plate is made of a diffused reflection material for reflecting the light including the specular reflection light and to eliminate uneven brightness by converging the specular reflection light to the boundary.

To converge the specular reflection light, the first focal point and the second focal points are positioned almost at the same height, and the position of the light source is shifted from the first focal point toward the reflecting plate. Also, the light source and the first focal point are arranged at positions closer to the reflecting plate. The second focal points are positioned near the boundary, and these positions are adjusted.

According to the present invention, a surface light source device can be provided, by which uneven brightness at the boundary of the two ellipses can be eliminated. The device according to the present invention is suitable as a surface light source device for a planar lighting system such as a ceiling lamp—as a backlight for liquid crystal display, as a backlight for transmission type signboard, or as a backlight for medical application to examine radiogram.

In a surface light source device using a reflecting mirror for backlight described in the background art, transmissivity is not more than 60% for the purpose of providing even directivity as the diffusion plate. According to the present invention, a diffusion plate with transmissivity of not more than 65% can be used. If a diffusion plate with high transmissivity can be used, it is possible to have brighter surface light source. This may be attributed to the fact that high directivity can be assured under the diffusion plate because not only the specular reflection light but also diffused reflection light can be used.

DETAILED DESCRIPTION OF THE PREFERRED EMBODIMENTS

Detailed description will be given below on embodiments of the present invention referring to the attached drawings.

Embodiment 1

Figure 1:
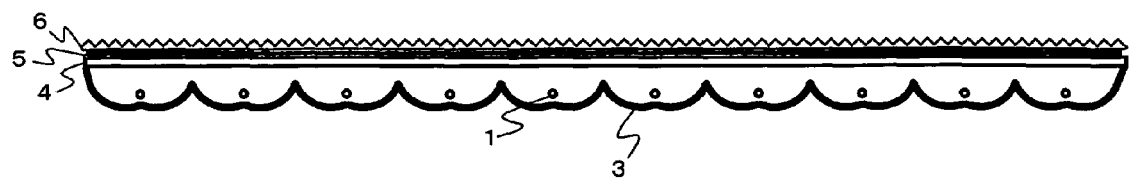
FIG. 1 is a cross-sectional view of a surface light source device of the present invention as seen from a direction perpendicular to line light sources of the device.

FIG. 1 is a cross-sectional view of a surface light source device according to the present invention as seen from a direction perpendicular to line light sources. This surface light source device comprises line light sources 1 such as cold cathode tubes, a reflecting plate 3 designed in a form to enclose each of the line light sources 1, a diffusion plate 4 arranged immediately above the reflecting plate 3, and optical films such as a diffusion film 5 or a prism sheet 6 to be added on the diffusion plate 4 when necessary.

In FIG. 1, the reflecting plate 3 comprises reflecting surfaces primarily for diffused reflection while specular reflection light components are increased by smoothening the reflecting surfaces. A cross-section of the reflecting plate 3 perpendicular to each of the line light sources 1 is designed in such a form that two half-ellipses (or dual half-ellipses) are aligned as many as the number of the line light sources 1.

Figure 2:
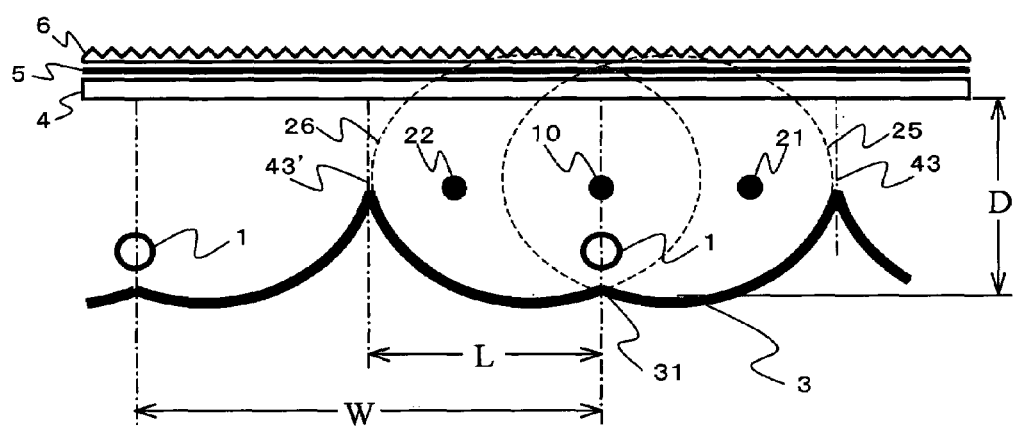
FIG. 2 is a partially enlarged cross-sectional view of the surface light source device shown in FIG. 1.

FIG. 2 is a partially enlarged cross-sectional view of the surface light source device shown in FIG. 1. There are provided a first ellipse 25 having a first focal point 10 and a second focal point 21 and a second ellipse 26 having a first focal point 10 and a second focal point 22, and the first focal point is commonly shared by the two ellipses. The cross-section of the reflecting plate 3 is designed in such a form that contours of these ellipses 25 and 26 are divided by a straight line, which includes the commonly shared focal point 10 and the other two focal points 21 and 22 to form two half-ellipses aligned with each other.

The reflecting plate 3 encloses the line light source 1 by two half-ellipses and reflects a light from the line light source 1 by specular reflection and by diffused reflection. Reference numerals 43 and 43' each represents a boundary between the two half-ellipses.

Also, each of a plurality of the line light sources 1 arranged immediately under the diffusion plate 4 is disposed along a straight line, which connects an intersection 31 of the two divided half-ellipses to the commonly shared focal point 10. An interval W of the line light source 1 is greater than the depth D of the reflecting plate 3. Therefore, compared with the number of the line light sources required in a conventional type reflecting plate of planar shape, it is possible to reduce the number of the line light sources.

Figure 3:
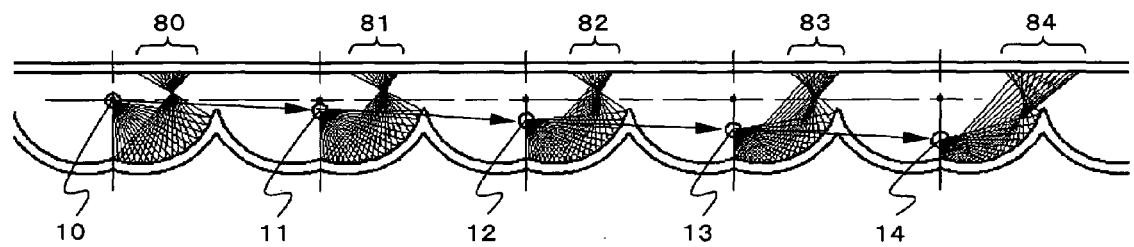
FIG. 3 is a drawing to show tracing of light when positions of the line light sources are shifted.

FIG. 3 is a drawing to show tracing of the light when positions of the line light sources arranged at the first focal point 10 are shifted to positions 11 to 14 closer to the reflecting plate. When the light source is arranged at the first focal point 10, the specular light is represented by a numeral 80. By shifting the positions of the line light sources to 11, 12, 13 and 14 toward the reflecting plate, specular light can be distributed to 81, 82, 83 and 84 respectively near the boundaries of the two half-ellipses.

Figure 4:
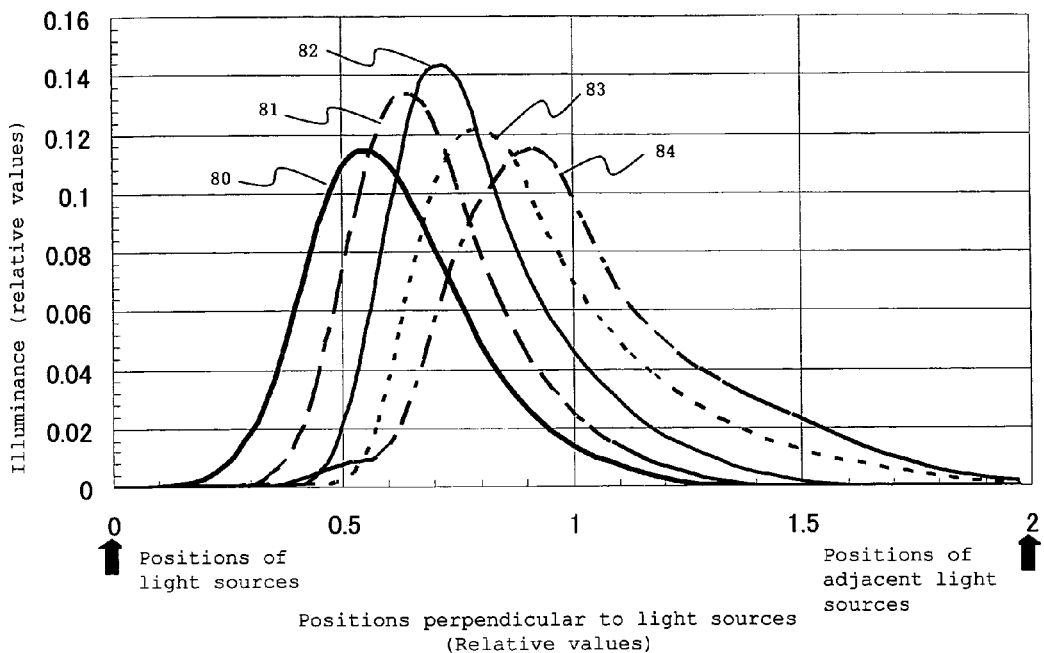
FIG. 4 is a diagram to show the distribution of illuminance of specular reflection light on a diffusion plate shown in FIG. 3.

FIG. 4 is a diagram to show the distribution of illuminance of the specular reflection light on the diffusion plate when the specular reflection lights 80 to 84 are simulated. On the axis of ordinate, relative values are represented when the maximum illuminance on the diffusion plate is regarded as 1. On the axis of abscissa, relative values at positions perpendicular to the line light sources are represented. Each of these values is a value obtained by dividing the position perpendicular to the line light source by a distance (L=1) from the light source to the boundary.

In FIG. 4, when the position of the line light source is shifted toward the reflecting plate as shown in FIG. 3, the specular reflection light can be distributed from the position of the specular reflection light 80 to the specular reflection light 84 near the boundary of the reflecting plate. These values of the specular reflection lights 80-84 are over 10% of total light amount. This is the ratio of the specular reflection lights on one side of the boundaries of the two half-ellipses in FIG. 3. If the specular reflection lights on both sides at the boundaries are summed up, each of the values of these lights exceeds 20% of total light amount.

Figure 5:
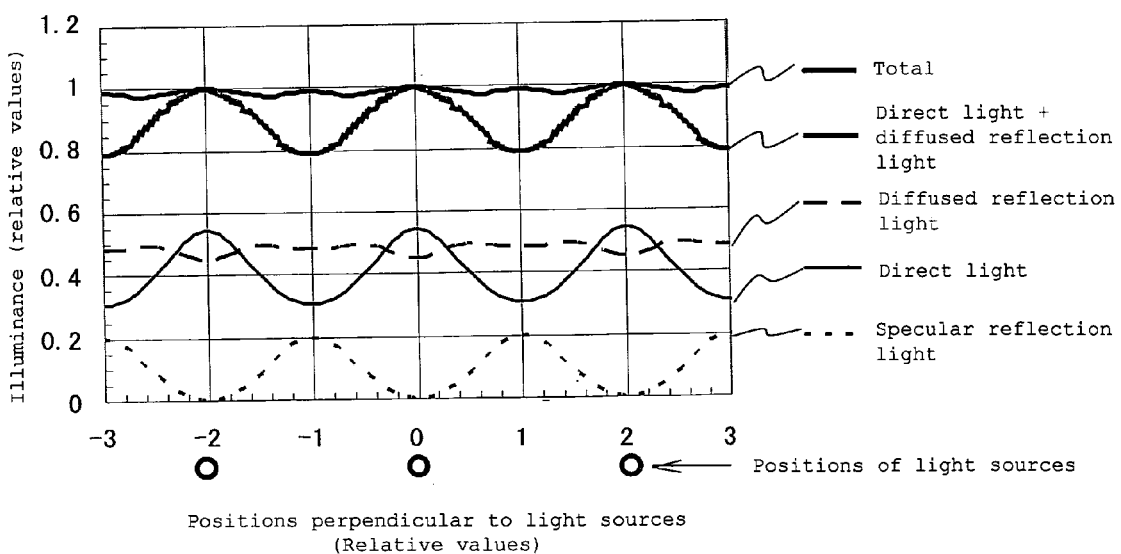
FIG. 5 is a diagram to show the distribution of illuminance on the diffusion plate.

FIG. 5 is a diagram to show the distribution of illuminance on the diffusion plate for direct light, diffused reflection light, specular reflection light, "direct light+diffused reflection light", and for the total amount. Similarly to the case shown in FIG. 4, values represented on the axis of ordinate and on the axis of abscissa are relative values of illuminance and relative values of the positions perpendicular to the light sources respectively. This distribution is the result of simulation by dividing the light amount to the direct light, the diffused reflection light, and the specular reflection light.

In FIG. 5, the diffused reflection lights are distributed almost flatly except that the positions immediately above the light sources are slightly dropped. The positions immediately above the light sources are slightly dropped because the diffused reflection light is behind each of the light sources. The direct light is at the brightest when it is immediately above the light source, and the increasing amount of the brightness of the direct light is more than the degree of dropping amount of the diffused reflection light. Thus, the dropping of the diffused reflection light immediately above the light source causes no problem. The direct light reaches the maximum at the position immediately above the light source and it reaches the minimum at the boundary, and the difference between the maximum and the minimum light amounts is about 20%.

The dropping of the light amount of "the direct light +the diffused reflection light" at the boundary is about 20% of the total light amount at the maximum. This is caused by the amount of dropping of the direct light. Therefore, the dropping should be compensated by the specular reflection light. That is, the phase of the specular reflection light is reverse to the phase of the direct light, and the amplitude is approximately equal to each other.

Figure 6:
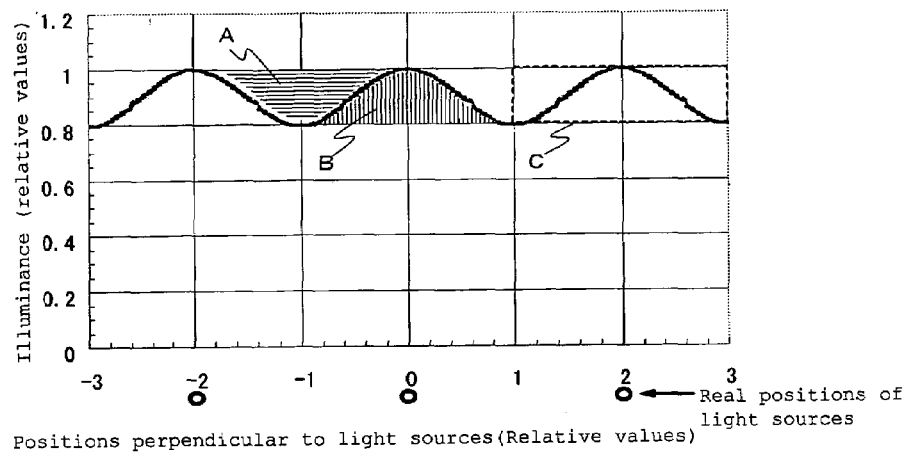
FIG. 6 is a diagram of the distribution of illuminance of "direct light+diffused reflection light" on the diffusion plate.

FIG. 6 is a diagram to explain the compensation by the specular reflection light, and only the light components (the direct light+the diffused reflection light) as shown in FIG. 5 are extracted and shown.

In FIG. 6, the light components (the direct light+the diffused reflection light) are approximately in form of a sine curve. The light amount to be compensated A and the light amount B on the opposite side are in the forms symmetrical to each other. Therefore, the area of A is approximately about one-half of the area of C for each section. The area of C is obtained as "the dropping amount (20%)×width of the dual half-ellipses". Thus, when the interval of the light source is two times as much as the depth of the reflecting plate, it is enough if specular reflectivity is about 10%. When simulation is performed by assuming that the specular reflectivity is 10%, the total of the direct light, the diffused reflection light and the specular reflection light is almost in flat form.

Figure 7:
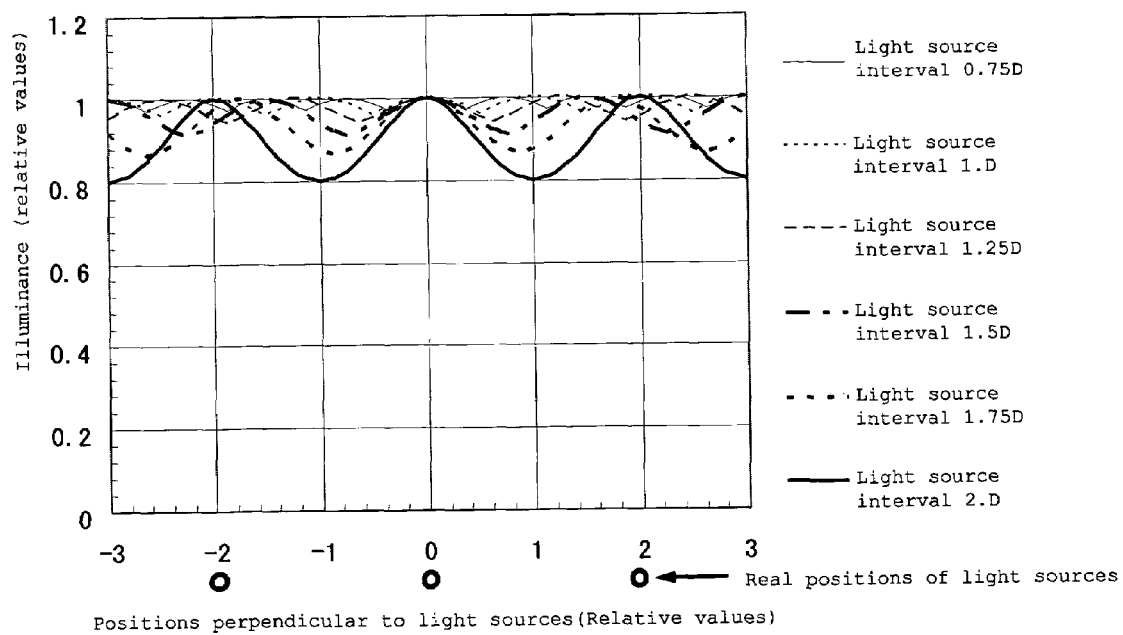
FIG. 7 is a diagram to show the distribution of illuminance of a direct light on a dual half-elliptic reflecting plate.
Figure 8:
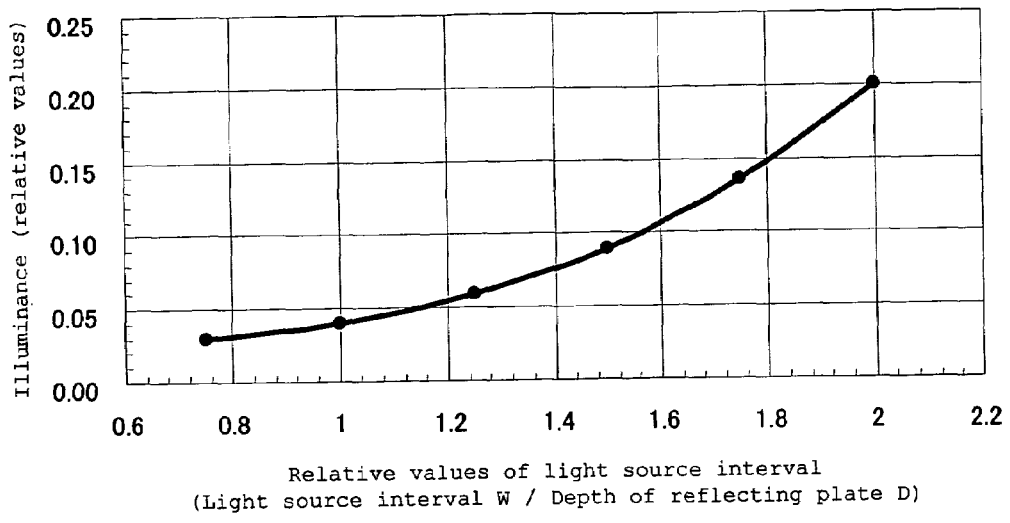
FIG. 8 is a graphic representation showing the relation between an amount of dropping of the direct light on the dual half-elliptic reflecting plate and light source interval.

FIG. 7 shows the results of calculation of the distribution of the direct light when the interval of the light source of the dual half-elliptic reflecting plate is changed in order to generalize the specular reflection light amount as required. FIG. 8 is a graphic representation of the dropping amount of the illuminance shown in FIG. 7 to facilitate the explanation of the dropping amount of the illuminance.

The present embodiment is based on a case where the interval of the light source is greater than the depth of the reflecting plate. As shown in FIG. 8, the dropping amount is 4% when the interval of the light source is equal to the depth of the reflecting plate. As already explained, the distribution of illuminance of the direct light is approximately in form of a sine curve. Thus, the reflectivity (the ratio of reflection) required is more than one-half of it, i.e. more than 2%. When the interval of the light source is twice as much as the depth of the reflecting plate, the dropping amount is 20%, and the specular reflectivity required is one-half of it, i.e. 10%.

Figure 9:
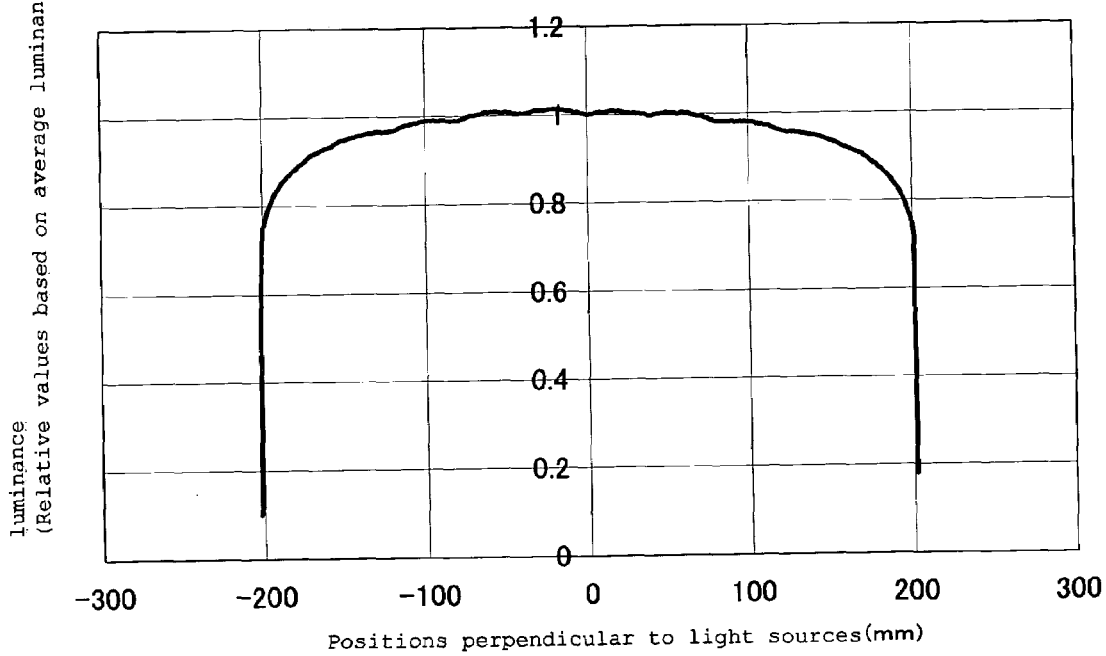
FIG. 9 is a diagram to show the distribution of luminance in a direction perpendicular to the light sources.

FIG. 9 is a diagram to show the distribution of illuminance in a direction perpendicular to the light source of a surface light source device produced on trial basis. In FIG. 9, in order to facilitate the explanation of uneven luminance, average luminance among "the center of the light source ±100 mm" is set to 1. This surface light source device is designed as follows: The value of the light source interval divided by depth of the reflecting plate is about 2 times as much as the value of the case when the depth of the reflecting plate D is 18 mm and the interval of light source W is 40 mm. Also, the reflecting plate is designed in form of a dual half-ellipses. As the line light source, a cold cathode tube is arranged at a position about 10 mm from the first focal point in a direction toward the reflecting plate. Also, immediately above the reflecting plate, a set of optical films, comprising a diffusion plate, a diffusion film and a prism sheet, is arranged in this order from the line light source.

In this trial production, the reflecting plate is produced by injection molding of a resin added with a diffused reflection agent and by using the reflecting surface designed as mirror surface. It is also possible to have specular reflectivity closer to 10% when a resin added with a diffused reflection agent is used and the surface of a die is prepared smoother than in normal case.

In the present embodiment, the reflecting plate reflects the light by specular reflection and by diffused reflection. The reflecting plate to reflect the light by specular reflection must be a reflecting surface with high reflectivity. To produce this reflecting plate, a thermoplastic molding resin such as polycarbonate resin is added with a visible light diffused reflection agent such as titanium oxide, and this resin material is used to fabricate the reflecting plate by injection molding, extrusion molding or compression molding. In this case, if the surface of the die is finished as mirror surface, specular reflectivity of the reflecting plate can be relatively easily increased. It is also possible to perform micro-bubble foam molding using a supercritical fluid or foam molding using a chemical foaming agent, and to produce micro-size voids and to perform molding.

Figure 10:
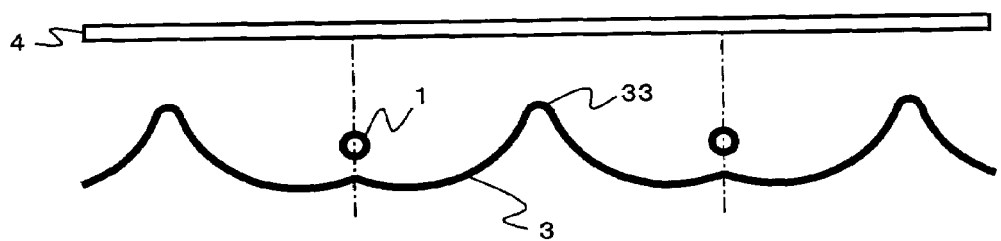
FIG. 10 is a cross-sectional view in a direction perpendicular to the light sources of the surface light source device using a sheet metal reflecting plate.

Further, it is also possible to attach a diffused reflection film with high reflectivity produced by foam molding to a metal plate, which has been prepared by sheet metal working. Also, this can be produced by coating a white coating material with high reflectivity such as titanium oxide on the surface of a metal plate fabricated from sheet metal. In this case, as shown in FIG. 10, a boundary 33 with roundness is prepared so that the entire reflecting plate can be integrally fabricated.

Embodiment 2

Figure 11:
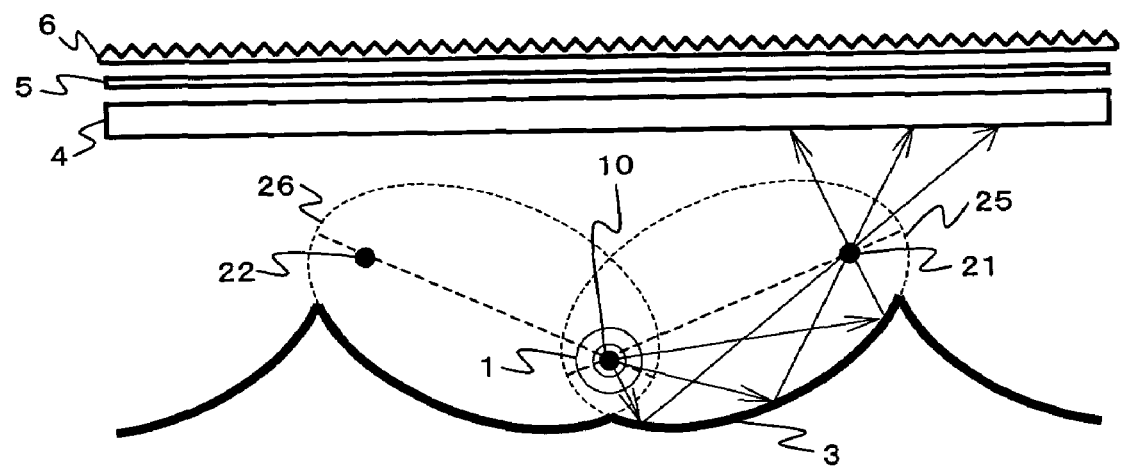
FIG. 11 is a cross-sectional view in a direction perpendicular to the light sources of the surface light source device of Embodiment 2.

FIG. 11 is a partially enlarged cross-sectional view in a direction perpendicular to the line light source of the surface light source device of the present invention. This Embodiment 2 is similar to Embodiment 1 except that the position of the first focal point 10 as commonly shared is shifted down to the position of the line light source 1.

In this embodiment, the cross-section of the reflecting plate 3 perpendicular to the line light source 1 is in form of dual half-ellipses, in which the contours of the two ellipses 25 and 26 commonly sharing the first focal point 10 are divided between the first focal point 10 positioned closer to the reflecting plate 3 and the two second focal points 21 and 22 positioned closer to the diffusion plate 4. The reflecting plate 3 encloses the line light source 1 arranged at the first focal point 10 and reflects the light from the line light source 1 toward the diffusion plate 4 by specular reflection and by diffused reflection.

In this embodiment, the position of the first focal point 10 is the same as the position of the line light source 1. Thus, the specular reflection light can be converged to points near the second focal points 21 and 22. This is because luminance distribution may be dropped only at the boundary, depending on the line light source 1 and the diffusion plate 4 and on the type of the optical films (the diffusion film 5 and the prism sheet 6). Also, it is possible to adjust the degree of convergence of the specular reflection light toward the boundary by changing the positions of the second focal points 21 and 22.

Embodiment 3

Figure 12:
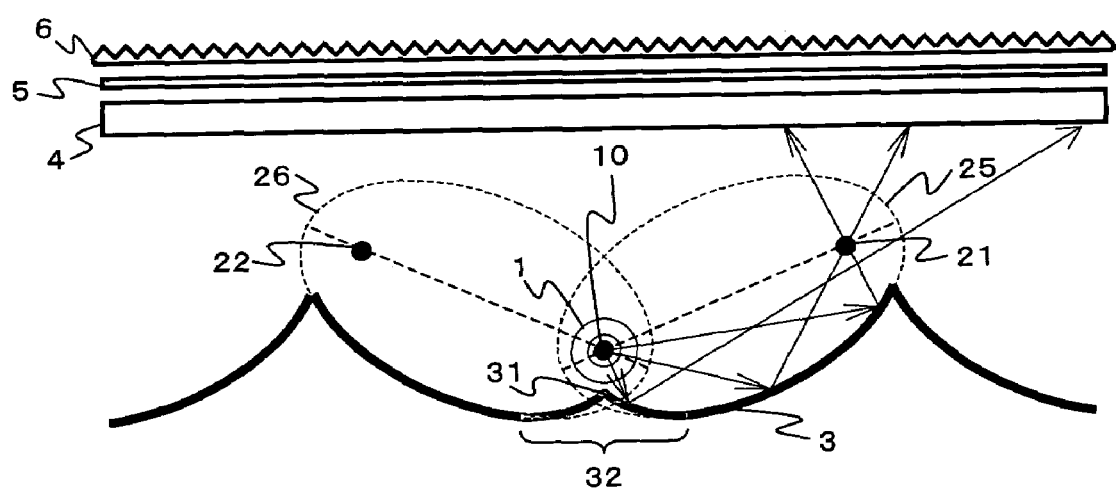
FIG. 12 is a cross-sectional view in a direction perpendicular to the light sources of the surface light source device of Embodiment 3.

FIG. 12 is a partially enlarged cross-sectional view in a direction perpendicular to the line light source of the surface light source device of the present invention, and the shape of the reflecting plate 3 shown in FIG. 11 is slightly changed. In FIG. 12, the reflecting plate 3 is in such shape that two half-ellipses are aligned with each other and an intersection 31 of the two divided half-ellipses is shifted toward the diffusion plate 4.

The shape of the dual half-ellipses aligned with each other can be produced by using a die, while it is also possible to provide the reflecting plate with a projection 32 to cover the intersection 31 instead of shifting the intersection 31 of the two half-ellipses. This projection 32 is suitable for the adjustment of the specular reflection light after the die has been fabricated.

In this embodiment, the distribution of the specular reflection light can be adjusted—not only by changing the positions of the focal points 21 and 22 as in Embodiment 2, but also by modifying the shape of the dual half-ellipses.

Embodiment 4

Figure 13:
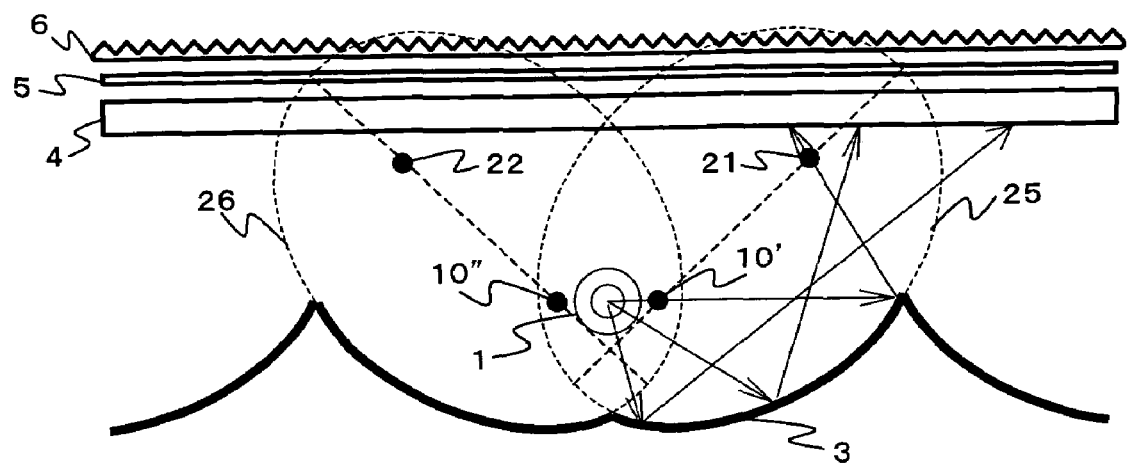
FIG. 13 is a cross-sectional view in a direction perpendicular to the light sources of the surface light source device of Embodiment 4.

FIG. 13 is a partially enlarged cross-sectional view in a direction perpendicular to the line light source of the surface light source device of the present invention. In FIG. 13, the first focal point is not commonly shared by the two half-ellipses, but the first focal points are shifted toward left and right respectively from the position of the line light source 1.

In FIG. 13, on the cross-section of the reflecting plate 3 perpendicular to the line light source 1, the two ellipses 25 and 26 intersect each other. The ellipses 25 and 26 are aligned with each other where a straight line including the focal points 10' and 21 of the first ellipse intersects a straight line including the focal points 10" and 22 of the second ellipse, and contours of the ellipses 25 and 26 are divided by straight lines each containing the focal points 10' and 10" respectively positioned closer to the reflecting plate 3. Also, the reflecting plate 3 encloses the line light source 1, which is located at the middle of the straight line connecting the focal point 10' with the focal point 10" of the ellipses 25 and 26 respectively positioned closer to the reflecting plate 3, and the reflecting plate reflects the light from the line light source 1 by specular reflection and by diffused reflection.

As it is evident from arrows of the specular reflection light shown in FIG. 13, the amount of the light directed to adjacent section of the dual half-ellipses is increased. The light coming from the adjacent section is sent in opposite direction from the direction of the direct light from the line light source 1, and this is helpful to provide better symmetry of directivity.

Embodiment 5

Figure 14:
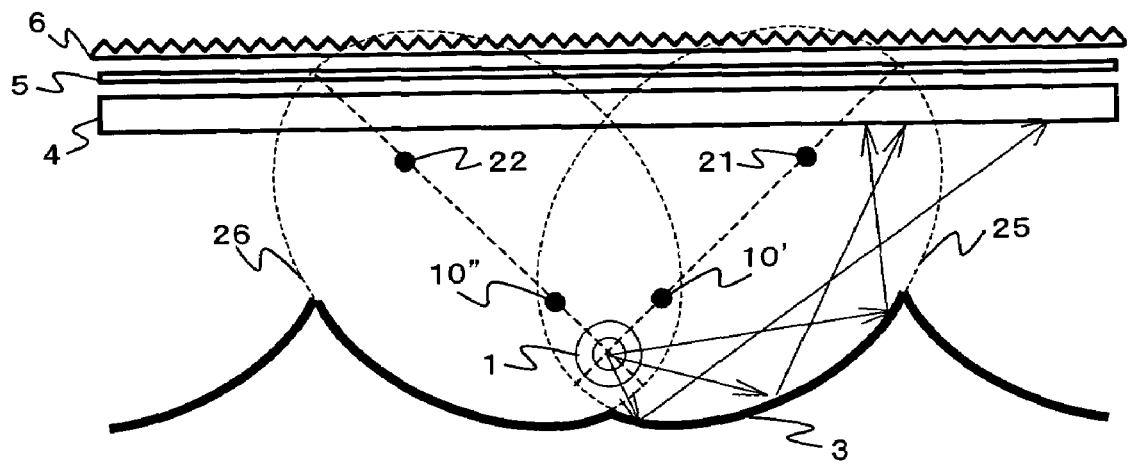
FIG. 14 is a cross-sectional view in a direction perpendicular to the light sources of the surface light source device of Embodiment 5.

FIG. 14 is a partially enlarged cross-sectional view in a direction perpendicular to the line light source of the surface light source device of the present invention. In FIG. 14, the position of the line light source 1 shown in FIG. 13 is changed.

In FIG. 14, the line light source 1 is located at an intersection of a straight line including the focal points 10' and 21 of the first ellipse with a straight line including the focal points 10" and 22 of the second ellipse, and the reflecting plate 3 encloses the line light source 1.

In this embodiment, the position of the light source is shifted toward the reflecting plate. As a result, the amount of light directed toward the adjacent section is increased further.

As already explained, in the dual half-ellipses, the depth of the reflecting plate is changed due to the positions of the first and the second focal points and to the size of each of the ellipses. In actual design, these may be appropriately selected depending on the interval of the light source and the depth of the reflecting plate and on the distribution of the specular reflection light.

What we claim is:

1. A surface light source device, comprising a plurality of line light sources positioned immediately under a diffusion plate, and a reflecting plate for reflecting a light from each of said line light sources, wherein:
    a cross-section perpendicular to the line light source of said reflecting plate is arranged to form at least two elliptical sections of two intersecting ellipses where the two ellipses commonly share a focal point and are divided by a straight line, the straight line includes the focal point commonly shared and two other focal points; and
    said reflecting plate at least partially encloses the line light source and reflects light from the light source toward the diffusion plate by specular reflection and by diffuse reflection.

2. A surface light source device according to claim 1, wherein the axis of said line light source is positioned to cross and form a right angle with a straight line which connects the intersection points of the ellipses with the commonly shared focal point.

3. A surface light source device according to claim 2, wherein the phase of a light amount distribution curve of the direct light from the line light source projected toward the diffusion plate is reverse to the phase of a light amount distribution curve of the specularly reflected light from the reflecting plate, and the amplitude of the light amount distribution of the direct light is approximately equal to the amplitude of the light amount distribution of the specularly reflected light.

4. A surface light source device according to claim 3, wherein specular reflectivity of said reflecting plate is set to a range of greater than 2% to about 10%.

5. A surface light source device according to claim 3, wherein interval between the subsequent line light sources is greater than depth of the reflecting plate.

6. A surface light source device according to claim 1, wherein said reflecting plate is a molded member comprising a resin material containing a thermoplastic resin and a visible light diffused reflection agent forming methods.

7. A surface light source device according to claim 1, wherein said reflecting plate is a foam molded member.

8. A surface light source device according to claim 1, wherein said reflecting plate comprises a metal plate, techniques, having diffuse reflection film attached to a surface of the metal plate surface.

9. A surface light source device according to claim 8, wherein the diffuse reflecting film contains a white coating material with high reflectivity coated on surface of the metal plate.

10. A surface light source device according to claim 1, wherein segments of the elliptical sections proximal to the intersection between the elliptical sections of two ellipses are shaped to form rounded transitions.

11. A surface light source device, comprising a plurality of line light sources positioned immediately under a diffusion plate, and a reflecting plate for reflecting a light from each of said line light sources, wherein:
    a cross-section perpendicular to the line light sources of said reflecting plate is arranged to form at least two elliptical sections of two intersecting ellipses where the two ellipses commonly share a focal point and are divided by a straight line parallel to the diffusion plate, the straight line intersects the major axis of the two ellipses sharing the focal point between the commonly shared focal point positioned closer to the reflecting plate and a focal point positioned closer to the diffusion plate; and
    said reflecting plate at least partially encloses the line light source located at the commonly shared focal point and reflects a light from the line light source toward the diffusion plate by specular reflection and by diffuse reflection.

12. A surface light source device according to claim 11, wherein said reflecting plate has a cross-section perpendicular to the line light sources in form of at least two elliptical sections of two intersecting ellipses the dividing straight line parallel to the diffusion plate is shifted toward the diffusion plate.

13. A surface light source device according to claim 11, wherein said reflecting plate is provided with a projection to cover an intersection of the two elliptical sections.

14. A surface light source device, comprising a plurality of line light sources positioned immediately under a diffusion plate, and a reflecting plate for reflecting a light from each of said line light sources, wherein:
    a cross-section of said reflecting plate perpendicular to the line light source is arranged to form at least two elliptical sections of two intersecting ellipses where the major axis of the ellipses are positioned to intersect in a proximity of the reflecting plate and the elliptical sections are divided by a straight line parallel to the diffusion plate and including a focal point of each ellipse positioned closer to the reflecting plate;
    and said reflecting plate at least partially encloses the line light source located at the axis of symmetry of the focal points of each intersecting ellipses, and the reflecting plate reflects a light from the line light source toward the diffusion plate by specular reflection and by diffuse reflection.

15. A surface light source device according to claim 14, wherein said reflecting plate at last partially encloses the line light source located at the intersection of the major axis of the intersecting ellipses.

* * * * *